(12) United States Patent
Ben-Romdhane

(10) Patent No.: US 6,526,831 B2
(45) Date of Patent: Mar. 4, 2003

(54) CONDITION BASED MONITORING BY VIBRATIONAL ANALYSIS

(75) Inventor: Mohamed Ben-Romdhane, Corona Del Mar, CA (US)

(73) Assignee: Innovative Technology Licensing, LLC, Thousand Oaks, CA (US)

(*) Notice: Subject to any disclaimer, the term of this patent is extended or adjusted under 35 U.S.C. 154(b) by 0 days.

(21) Appl. No.: 10/035,511

(22) Filed: Nov. 8, 2001

(65) Prior Publication Data

US 2002/0083773 A1 Jul. 4, 2002

Related U.S. Application Data

(62) Division of application No. 09/406,350, filed on Sep. 28, 1999, now Pat. No. 6,321,602.

(51) Int. Cl.$^7$ .............................................. G01N 29/00
(52) U.S. Cl. ........................................................ 73/660
(58) Field of Search ........................... 73/660, 659, 579; 702/77, 33, 34, 35, 36

(56) References Cited

U.S. PATENT DOCUMENTS

| | | | |
|---|---|---|---|
| 4,007,630 A | 2/1977 | Noda | 73/593 |
| 4,196,629 A | 4/1980 | Philips | 73/593 |
| 4,366,544 A | 12/1982 | Shima et al. | 702/56 |
| 4,493,042 A | 1/1985 | Shima et al. | 702/35 |
| 4,674,125 A * | 6/1987 | Carlson et al. | 382/49 |
| 4,692,909 A * | 9/1987 | Gard et al. | 367/45 |
| 5,235,534 A * | 8/1993 | Potter | 708/300 |
| 5,263,372 A | 11/1993 | Matsuzaki et al. | 73/593 |
| 5,501,105 A * | 3/1996 | Hernandez et al. | 73/660 |
| 5,544,073 A | 8/1996 | Piety et al. | 364/528.14 |
| 5,680,025 A | 10/1997 | Bowers, III et al. | 318/806 |
| 5,686,669 A * | 11/1997 | Hernandez et al. | 73/660 |
| 5,825,657 A * | 10/1998 | Hernandez | 702/182 |

FOREIGN PATENT DOCUMENTS

| | | |
|---|---|---|
| EP | 0724159 A1 | 7/1996 |
| EP | 0889314 A | 1/1999 |

OTHER PUBLICATIONS

Heinz P. Bloch–Fred K. Geitner, "Machinery Failure Analysis and Troubleshooting" *Practical Machinery Management For Process Plants*, Third Edition, 1997, vol. 2, PP. iv, 115, 351–433, 607–608.

* cited by examiner

Primary Examiner—Richard A. Moller
(74) Attorney, Agent, or Firm—Koppel, Jacobs, Patrick & Heybl

(57) ABSTRACT

An apparatus and method monitors the condition of a bearing/shaft assembly by forming diagnostics based on spectral analysis of assembly's vibration. Baseline parameters are determined by a microprocessor analysis of the vibration spectra, comparing actual peaks to the peaks predicted by a model. The microprocessor estimates rotation rate and preferably number of rolling elements by attempting to fit the model to the actual vibrational spectrum, by varying the assumptions. Baseline profiles are formed from one or more selected tones and preferably also harmonics thereof, to characterize the bearing/shaft assembly. The baseline profiles and parameters are compared against later acquired vibrational characteristics, and the comparison is used to diagnose bearing and/or shaft conditions.

1 Claim, 14 Drawing Sheets

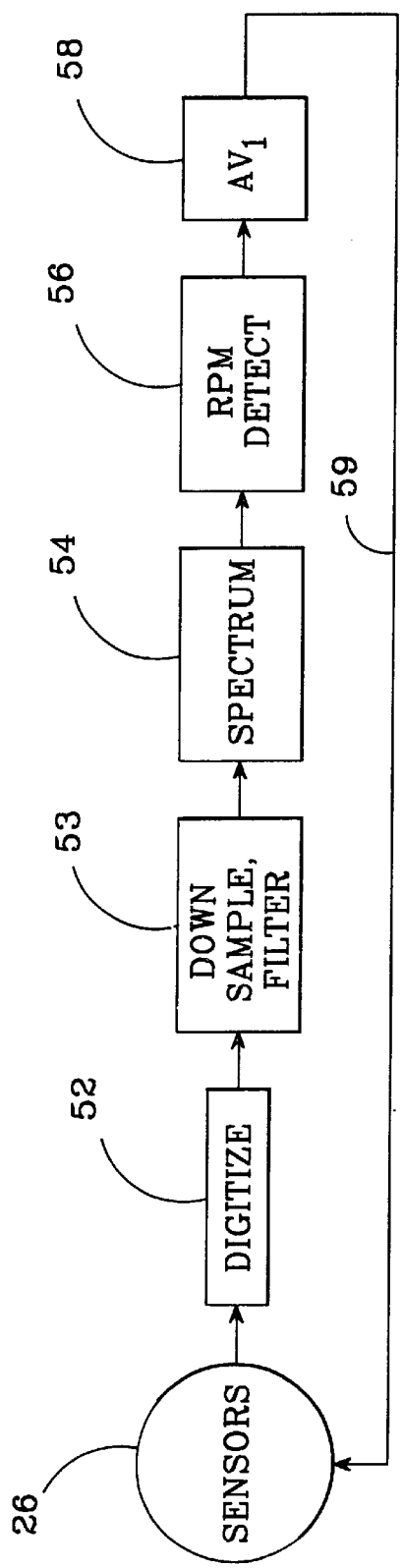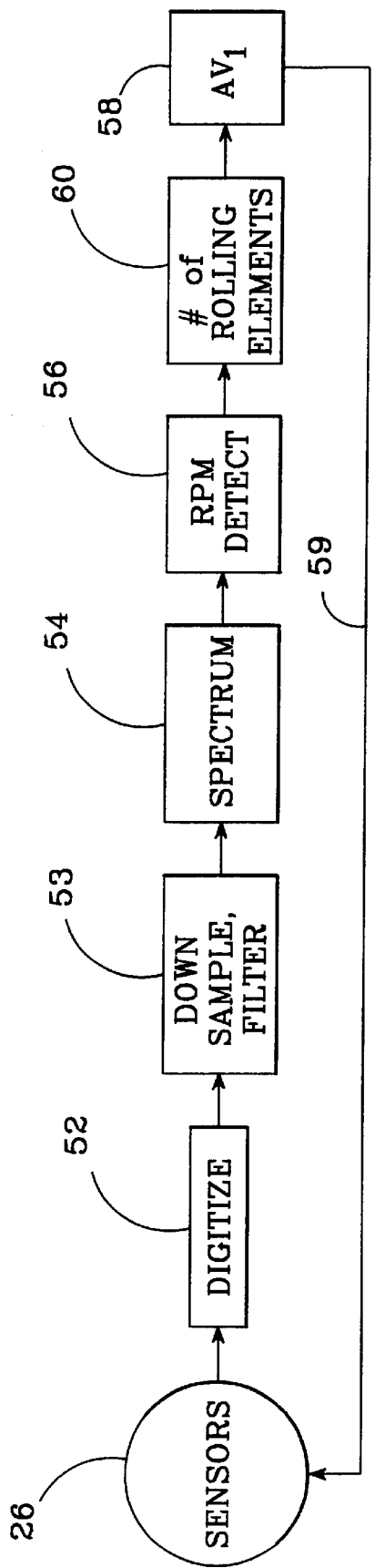
FIG.4a
FIG.4b

Diagnostics & Status Report
───────────────────────────

......Status Report.....      180
182 Date = 11 June 1999
    Detected Number of Balls in Bearing = 8
    Detected RPM = 2103
186 Sampling Frequency = 47875Hz
    Decimation Factor = 6    184

......Bearing Diagnostics: RESIDUAL INDICATION.....
Current Residual Factor = 0.835004
Normal Condition Residual Factor = 0.758739    188
Residual Increase Factor = 1.100515
Bearing Condition: NORMAL ........Inner Ring Bearing Diagnostics.......
Inner Ring Condition: NORMAL
Maximum Amplitude = 83.701049 dB
Harmonic Number = 1     190
Accumulation of Exceedences = 6.872580 dB
Maximum Exceedence = 2.488049 dB
Harmonic number of Maximum Exceedence 3

........Outer Ring Bearing Diagnostics.......
Outer Ring Condition: NORMAL
Maximum Amplitude = 89.475802 dB
Harmonic Number 4     192
Accumulation of Exceedences = 6.940731 dB
Maximum Exceedence = 3.316140 dB
Harmonic number of Maximum Exceedence 6

........Rolling Element Bearing Diagnostics.....
Rolling Element Condition : NORMAL
Maximum Amplitude = 93.926303
Harmonic Number 1     194
Accumulation of Exceedences = 11.014464 dB
Maximum Exceedence = 2.442624 dB
Harmonic Number of Maximum Exceedence 9

FIG.13a a —— — — —— — — —— — — —— — — ——a

......Cage Train Bearing Diagnostics.....

Cage Condition: NORMAL

Maximum Amplitude = 92.054881 dB

Harmonic Number 15

Accumulation of Exceedence = 14.772160 dB

Maximum Exceedence = 2.627506 dB

Harmonic Number of Maximum Exceedence 6

} 196

......Motor RPM Indication....

Condition : NORMAL

Maximum Amplitude = 104.050434 dB

Harmonic Number 2

Accumulation of Exceedences = 14.772160 dB

Maximum Exceedences = 2.627506 dB

Harmonic Number of Maximum Exceedences 20

CONDITION BASED MONITORING BY VIBRATIONAL ANALYSIS

This application is a divisional of Ser. No. 09/406,350, filed Sep. 28, 1999, now U.S. Pat. No. 6,321,602.

BACKGROUND OF THE INVENTION

1. Field of the Invention

This invention relates to monitoring of machinery or motors generally, and more specifically to the automated diagnosis of bearings by vibrational analysis.

2. Description of the Related Art

Rotating or oscillating motors of various sizes are ubiquitous in industrial, transportation and other applications. In many such applications it is desirable to diagnose various motor or bearing problems, as for example an imminent bearing failure, in a non-intrusive and non-destructive manner. Indeed, in many applications (for example, a ship engine) interruption of service to dissasemble a bearing for inspection would be wholly uneconomical if not disastrous.

Vibrational analysis has been used to non-intrusively diagnose motor and bearing problems without the need to interrupt operation of the motor or drive system. Various motor and bearing problems are known to relate directly to the presence of excessive vibration at frequencies related to the motor speed, typically expressed in RPM (revolutions per minute). For example, vibration at twice (2x) the motor RPM frequency often indicates mechanical bearing looseness. A vibration at a frequency of three times (3x) the motor RPM frequency often indicates misalignment of the bearings as related to the shaft. Such conventional methods of vibration analysis of machinery are discussed, for example, in Heinz P. Bloch and Fred K Geitner, *Machinery Failure Analysis and Troubleshooting* (Vol. 2), (Gulf Publishing, 1997) in Chapter 5, "Vibration Analysis". Conventional methods of vibration analysis commonly extract amplitude vs. frequency information from the vibration and are sensitive to the presence or absence of certain peak values, frequencies, or the change of a vibration waveform over time.

The conventional methods of machinery vibration analysis commonly require certain a priori information regarding the motor and/or bearings under consideration. For example, to properly analyze the vibration spectrum of a turning motor, conventional techniques require knowledge of the motor RPM (at the time the vibrational data was obtained). Other information specific to the motor/bearing system is required or greatly enhances the performance, such as the number of rolling elements per bearing. The required information is specific to the motor and/or bearing in each application, and must be provided by a user (or independent measurement). In some cases the user might actually be required to physically inspect a spare bearing to obtain the information. The precise RPM of the motor operation might vary, for example in a variable speed motor, making comparisons difficult. The necessity for such application-specific information is a great inconvenience at best, and generally discourages any attempt to develop a generally applicable, low-cost, and easily installed machine vibration analyzer.

U.S. Pat. No. 4,493,042 (1985) to Shima, discloses a bearing failure judging apparatus which diagnoses certain causes of a bearing failure from the time domain and frequency spectrum of a bearing's vibration. The method of the patent responds to localization of amplitudes of the time-domain waveform, the periods of wave pulsations, the degree of acuteness of the waveform envelope, and the presence or absence of a specific peak value in the frequency spectrum, as well as certain changes of the waveform over time. This method extracts some information from the waveform, including the presence of broad spectrum noise, or pulsate envelopes of vibration. But it does not respond to all of the various frequency components which may be present in a motor bearing vibration, which include multiple bearing tones and harmonics, corresponding to different bearing elements. Thus, the patented method does not extract all of the relevant information inherent in the vibration signal. This approach may provide some diagnostics, such as detection of lubrication shortage, foreign matter in the lubricant, or bearing scarring. It does not provide specific information as to which bearing is faulty, whether the rolling element or the cage is at fault, whether the bearing is misaligned with the shaft, or other detailed information.

Another limitation of previous systems is that the spectral resolution is poor in higher frequency ranges, where higher harmonics of defect tones lie.

Conventional vibration analysis typically uses wired vibration sensors which are often difficult to install in existing, typically crowded industrial environments. Cable installation can be expensive and time consuming, especially if it interferes with normal operation of the equipment.

SUMMARY OF THE INVENTION

In view of the above problems, the present invention is an apparatus and method which monitors the condition of a bearing/shaft assembly by forming diagnostics based on spectral analysis of the assembly's vibration. First, Baseline parameters are determined by a microprocessor analysis of the vibration spectra, comparing actual peaks to the peaks predicted by a model. The microprocessor estimates a rotation rate and preferably the number of rolling elements in the bearing by attempting to fit the model to the actual vibrational spectrum, by varying the assumptions. Baseline profiles are formed from one or more selected tones and preferably also harmonics thereof, to characterize the bearing/shaft assembly.

An efficient "downsampling" operation preferably provides digital filtering and resampling of the signal with a small number of operations, allowing low power, miniature circuits to be used for digital signal processing.

Preferably multiple tones and profiles are used as defect indicators, including fundamental RPM, Inner ring defect tone, outer ring defect tone, cage train defect tone, and rolling element defect tone. For each tone, a profile is calculated, summarizing the amplitudes of the tone and each harmonic, and their associated frequencies.

At a later time, bearing assembly vibration is again measured. The baseline profiles and parameters are compared against later acquired vibrational characteristics, and the comparison is used to diagnose bearing and/or shaft conditions. Deviations from the baseline tone intensities and profiles provide diagnostics which indicate the condition of the bearing. Profile "exceedences" and a "residue" parameter are also preferably calculated and used as diagnostic indicators of bearing condition.

The apparatus of the invention preferably includes sensors for sensing the vibration, an Analog to Digital converter for digitizing the vibrational signal, a digital signal processor which "downsamples" and calculates a frequency domain representation of the signal, and a microprocessor for analyzing the signal and forming diagnostics. These are most preferably integrated and packaged together with a portable power supply and preferably a wireless data transceiver, in a compact package. The entire device can then be easily mounted on a machine in proximity to a bearing of interest, without the necessity of a cable. Diagnostics are preferably summarized and then transmitted to a user or data station for output to a user.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 4a is a flow diagram showing in greater detail the vibration analysis steps of FIG. 3 in one embodiment of the invention;

FIG. 4b is a flow diagram showing in greater detail the vibration analysis steps of FIG. 3, in an alternate embodiment of the invention;

FIGS. 13a and 13b, which join at cut line a, are an example of a printed diagnostic output from the invention, which provides diagnostics on an example motor bearing.

DETAILED DESCRIPTION OF THE INVENTION

Figure 1:
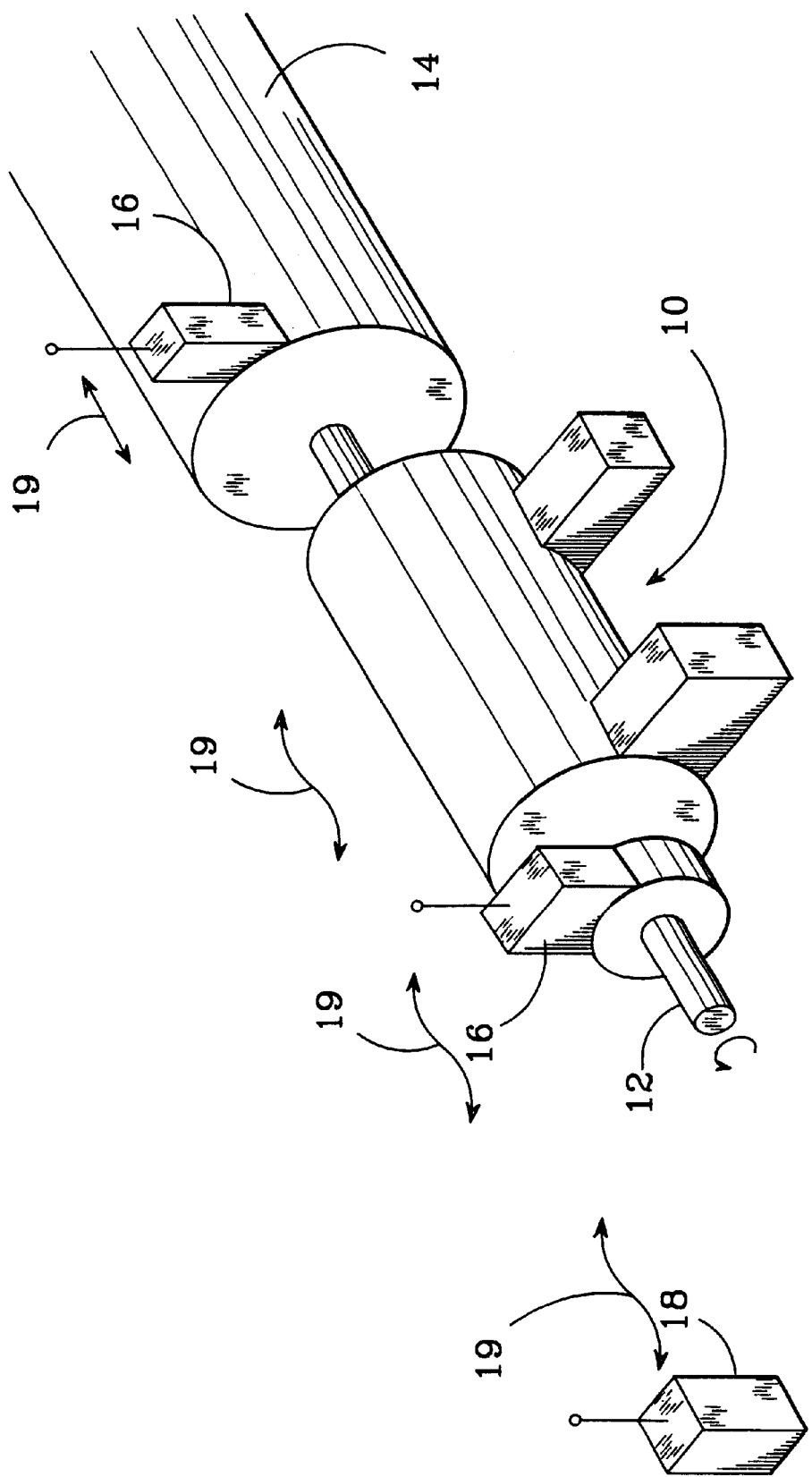
FIG. 1 is a perspective view of an example physical environment within which the invention is suitably used.

In FIG. 1 a typical physical environment suitable for the invention is shown. The invention operates in the context, typically, of a rotary motor drive 10 having internal bearings (not visible) and a shaft 12 which drives a load 14. One or more monitoring devices 16 are attached to the motor and/or the shaft at positions chosen to allow the sensing of motor vibrations of interest, typically near a bearing. Alternatively, the monitoring device 12 could be mounted on a rotating shaft 12. Motors of any size and type are suitable for the application of the invention: from small electrical motors to large, internal combustion engines as found in ships, for example. The monitoring device(s) 16 should include, at minimum, vibration sensors. Most preferably the monitoring devices 16 are fully integrated with complete hardware of the apparatus of the invention, including vibration sensors, an embedded data processor, a wireless transceiver and a portable power supply in a single package, mounted on the motor. The monitoring devices 16 are preferably programmable to carry out the method of the invention either locally or as part of a network of monitoring devices and users. Alternatively, the vibration signal could be transmitted from a sensor mounted on the motor to another location for processing by the method of the invention, for example by a processing station 18 in wireless communication with the monitoring devices 16.

During operation the motor 10 causes acoustic or subacoustic vibrations (which may be any detectable vibrational mode). The time, amplitude and frequency content of these vibrations are analyzed by the invention to yield information regarding bearing and motor conditions, including diagnostic information preferably providing a way to predict or prevent bearing failure.

It is advantageous to perform most of the signal processing and diagnostics locally, at the monitoring device 16, then communicate the results (preferably by wireless link 19) to the processing station 18. The advantage is derived because communication of data, especially by wireless means, generally consumes more power than data processing (which can be performed with low-power technology such as complementary metal oxide semiconductor or "CMOS"). Therefore, it is preferable that the monitoring station perform the signal and data processing and transmit only the more compact results (diagnostics) to a user.

Figure 2:
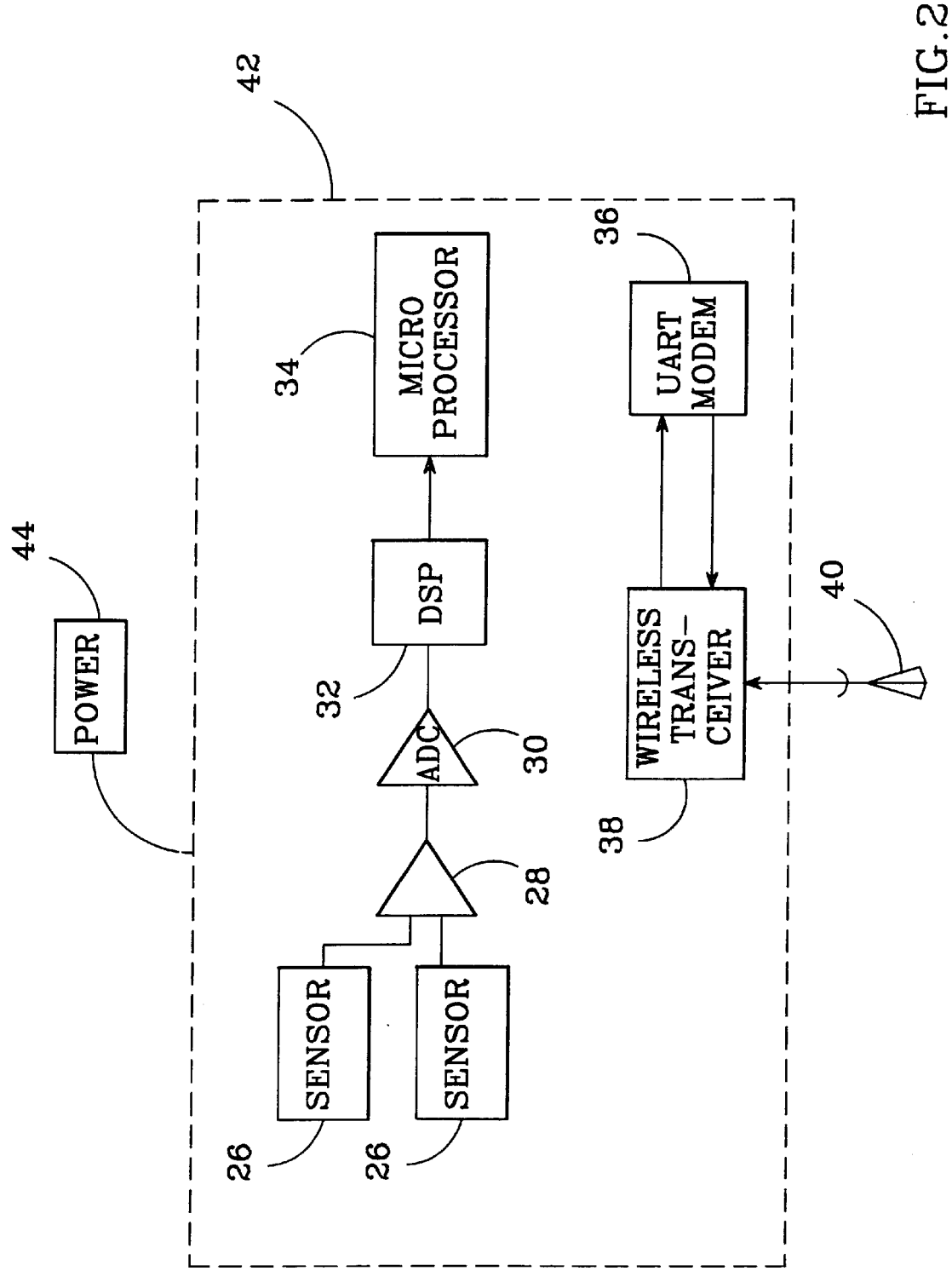
FIG. 2 is a block diagram of the apparatus of the invention.

FIG. 2 shows one embodiment of the apparatus of the invention which preferably is integrated and packaged as the monitoring device 16. The sensor 26 (optionally, multiple sensors) transduces the vibrations into an electrical signal for signal processing and analysis. The signal is amplified by interface electronics 28 and digitized by an analog to digital converter (ADC) 30.

Various electromechanical vibration transducers are known which can be used for the sensor(s) 26 in the invention. As one example, a suitable MEMS vibration sensor is described in U.S. Pat. No. 5,659,195 to William Kaiser et. al.

The interface electronics 28 should be appropriate to the type of sensor used. For example, capacitive or resistive sensors require specific, well known interface electronics to produce an electrical signal representative of the vibration. The interface electronics should also amplify the signal sufficiently to scale the amplitude within the dynamic range of the ADC 30.

The ADC 30 may be any suitable commercially available circuit. Various integrated ADC's are available, for example from Analog Devices, Inc. in Norwood, Mass. It should have a bandwidth, sensitivity, and sampling rate) sufficient to analyze the machinery which is its subject. In a typical motor application, with rotation in the neighborhood of 1800 RPM, a bandwidth of 20 KHz has been found to be sufficient. An ADC having low power consumption is generally desirable, to conserve battery life.

The digitized signal from the ADC 30 processed by a digital signal processor (DSP) 32, which is suitably either a dedicated signal processing integrated circuit, or a general purpose microprocessor programmed to perform the signal processing according to the method of the invention, described below. Various dedicated DSP's are available which are suitable, such as the TMS 320 C5x from Texas Instruments as one example. The Intel StrongARM 1100 microprocessor with a 133 MHz clock is an example of a general purpose microprocessor which can be used (both for signal processing and for the control functions of microprocessor 34, discussed below).

A microprocessor 34 is preferably provided which further analyzes the processed vibration signal, according to the method of the invention, and provides diagnostic output regarding the condition of the bearings or machine which is monitored. In the preferred embodiment, the microprocessor communicates with users and/or other monitoring devices by wireless means. A universal asynchronous receiver/transmitter (UART) and modem unit 36 is provided between the microprocessor 34 and a wireless transceiver 38, to communicate data and/or receive instructions. Typically, wireless communication is by radio via antenna 40, but other media such as optical, infrared, or ultrasonic communication are also possible with appropriate modifications. In one exemplary version of the invention, a Conexant RDSSS9M spread spectrum transceiver with a data rate of 100 Kbps provides radio communication in the 902–928 MHz band.

All of the above described components 26 through 38 are preferably integrated in a single package 42 and powered by a portable power supply 44 (typically a battery). Alternatively, any portion of the monitoring device which includes at minimum, the sensors 26, could be located on the subject machine, and the signal communicated for further processing at another location. Wireless communication is preferred in many applications because it is easily installed or removed. In many industrial installations, it may be extremely expensive and time consuming to install wiring for a wired vibration monitor.

The apparatus described above is programmed to perform the method of the invention, as described below. In the explanation which follows, it is significant that no a priori knowledge of the motor, shaft, bearings, or load is assumed, nor is a user required to input such information. The invention is capable of measuring, storing and learning characteristics of the motor system and deriving diagnostic information without such a priori data.

Figure 3:
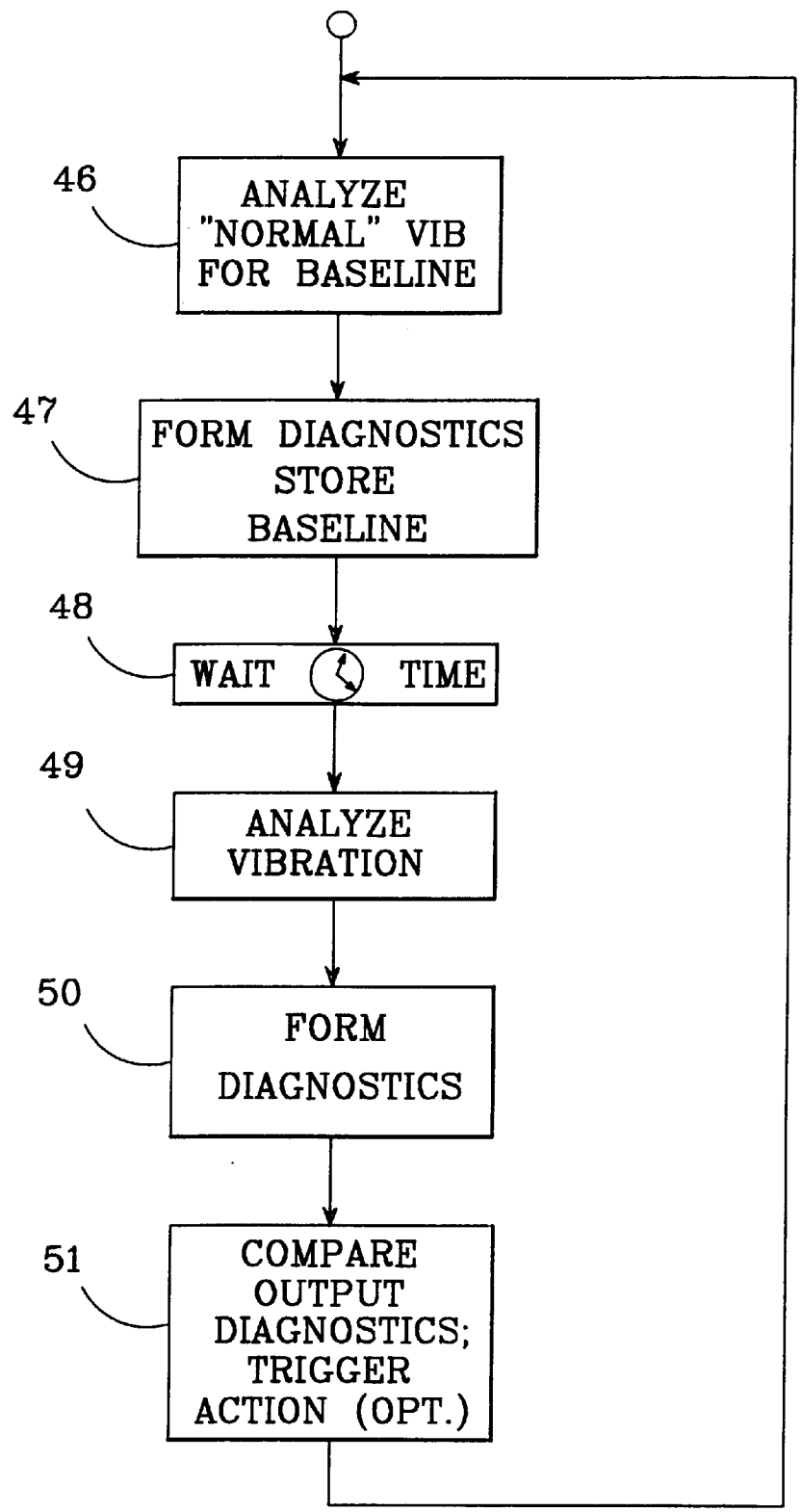
FIG. 3 is a flow diagram summarizing the method of the invention.

FIG. 3 shows affords a summary view of the method of the invention. First, a vibrational signal is taken from a normal bearing (operating within normal parameters) and the signal is analyzed to obtain a baseline spectrum (step 46). Next diagnostic parameters are formed and stored which records the baseline for future comparison (step 47). The invention then waits (step 48) for some time, which may be pre-determined or triggered by some outside event (such as a user inquiry or trigger). After some time, the invention analyzes another vibrational signal from the same sensor or sensors (step 49). The analysis is performed by essentially the same method in step 49 as was applied in baseline step 46. The result is a newer, "operational" spectrum. The "operational" spectrum is then used to form operating diagnostics (step 50). Finally, the operating diagnostics are compared with the baseline and the results are output for a user (step 51). Optionally included in step 51 is the capability to use the results of comparison to trigger some event or alarm, for example in the case where diagnostics indicate an imminent bearing failure. Thus the method of the invention includes two main phases of operation: (1) establishing baseline indicator parameters, and (2) comparing later signals to the established baseline parameters. This approach allows the invention to be used with a very wide range of machinery, with varying bearings and motors, without the need for an operator to input the initial expected parameters. The invention instead "learns" what is normal for the subject machine and looks for deviations from that norm.

Figure 7:
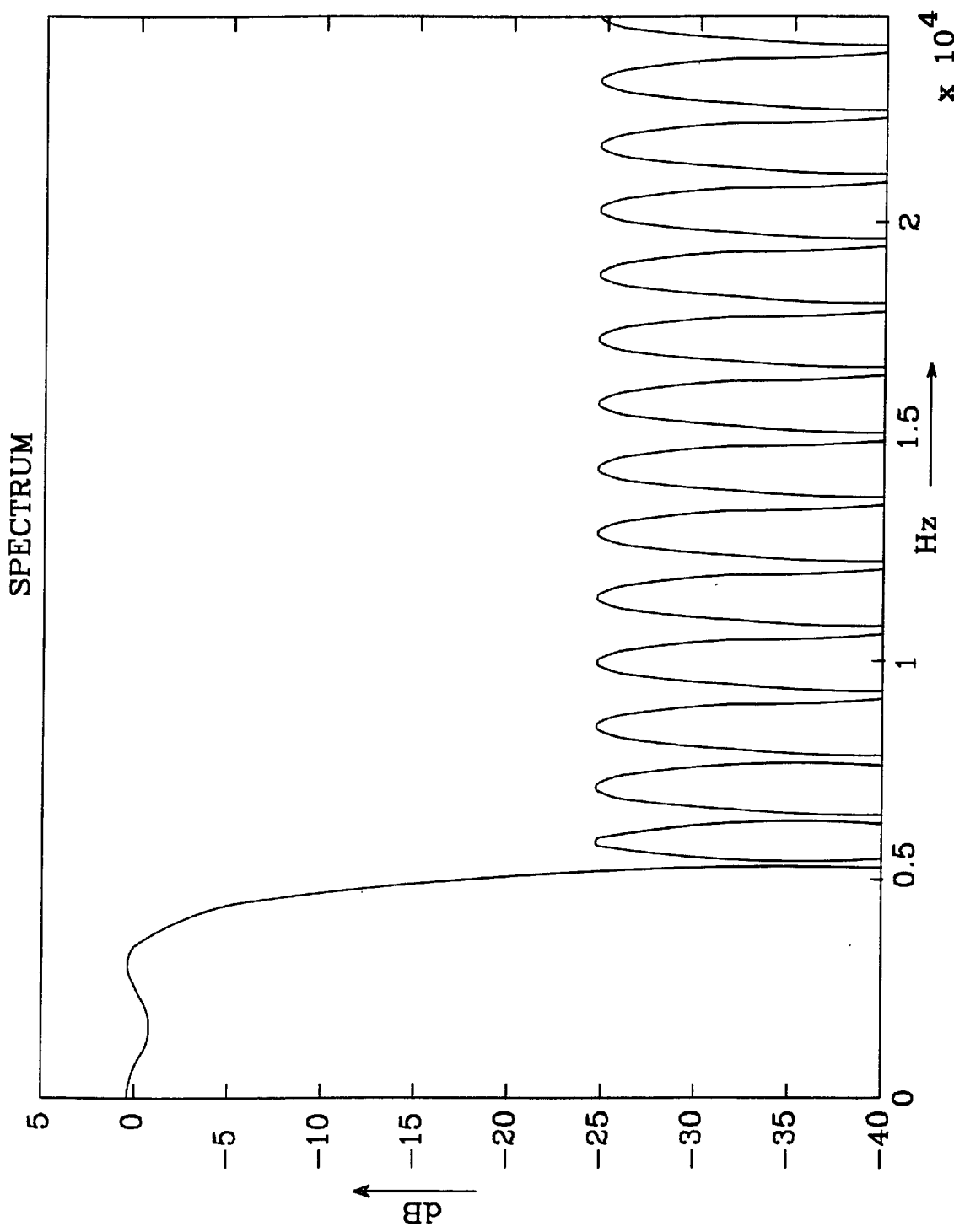
FIG. 7 is a graph of a frequency pass characteristic curve for a 35 coefficient digital filter realized according to the architecture shown in FIG. 6.

In one embodiment of the invention shown in FIG. 4a, the vibrational analysis steps 46 and 49 preferably comprise the steps shown. The sensor 26 provides a signal representative of a vibration, which is converted into digital form (step 52). After the sensor signal is digitized, it is resampled at a lower rate and preferably filtered by a "downsampling" functional step 53, which may be executed either by software programming of a microprocessor or by a dedicated signal processor circuit. This "downsampling" provides a frequency shifted and high spectral resolution version of the signal for further processing. This signal is then transformed into a frequency domain representation (step 54), preferably by Fourier transformation of the time-domain signal, or any of the known similar transform techniques. Again, either a dedicated signal processing circuit or a programmable software implementation (executed on a microprocessor) could be used. The transformed, frequency domain signal is then analyzed (step 56) by an RPM detecting algorithm which detects the fundamental rotational frequency of the motor, by methods described in detail below in connection with FIG. 7.

After the fundamental RPM frequency is detected, the spectral data from the spectrum analysis step 54 is preferably averaged (step 58) with prior recent spectra (if any exist) and the method repeats a predetermined number of times, by looping back via pathway 59. Averaging multiple spectra improves signal-to-noise ratio.

FIG. 4b shows a method of vibrational analysis which is used in an alternate embodiment of the invention. The alternate method includes an additional functional block 60, which detects the number of rolling elements in a bearing. This bearing enumerating step 60 suitably follows immediately after RPM determination step 56, and is described in detail below in connection with FIG. 8. The inclusion of bearing enumeration step 60 enhances the performance of the invention by determining, from the vibrational spectrum alone, the most likely number of rolling elements per bearing in a bearing which produces the sensed vibration. This information is in turn exploited by the diagnostic steps 47 and 50 (of FIG. 3) to identify specific defect indicators and extract detailed diagnostic information from the vibrational spectrum.

The "downsampling" function 53, RPM detection module 56 (in FIGS. 4a and 4b), and number of rolling elements detection module 60 (FIG. 4b) will next be described individually in greater detail, beginning with the "downsampling" module 53.

The "downsampling" module 52 allows the invention to examine particular regions of the frequency spectrum with higher resolution than would otherwise be possible, by resampling and filtering the data in the time domain before further manipulation of the data (for example, by Fourier transformation). For example, suppose hypothetically it is desired to analyze the vibration data to detect the presence, absence, or amplitude of certain spectral components located at 1810 Hz and 1820 Hz. If the signal is sampled conventionally at 40,000 samples/second, the transform spectrum will have a 20,000 Hz bandwidth. If a 512 point data set is used, then the resulting spectrum will have 512 frequency bins, yielding (at best) an approximate resolution of 40 Hz between data points. This is inadequate to resolve the two hypothetical signals of interest.

Resolution is improved by resampling the signal at a lower rate (but for a longer time, to provide the same number of points in a data set for transformation). This has the effect of shifting the zero point of frequency while "zooming in" to provide improved resolution within a frequency window. For a specific example, assume that an original signal is sampled at 40,000 Hz, with a data set length of 512 points used for the FFT. If the sample signal is resampled once every ten data points, then Fourier transformed, the spectral window shrinks to 1/10 the original bandwidth (20,000 Hz) to yield a 2000 Hz spectral window. If we then resample for a longer period, ten times the original sample time, we obtain 512 data resamples. The resulting 2000 Hz Fourier transform window will have 512 bins, each representing 4 Hz spectral width. Thus the resampled FFT gives much more spectral resolution than the original sampled FFT, but this enhancement comes with a certain drawback: signals which lie in frequency regions higher than the resampling rate will be "aliased" down into the FFT window, as is well known. In the example given above, signals at 2000 Hz plus f will be aliased down to f, as will signals at 4000 Hz plus f, 6000 Hz plus f, etc.

In order to prevent aliasing of unwanted frequencies into a target spectral range, the signal must be filtered before sampling (either by analog or digital methods), as is well known. In one embodiment of the invention a particularly efficient means of signal processing is used which accomplishes both resampling and filtering with the same set of operations, which allows more economical use of hardware. This economical method thus allows more inexpensive, compact, and low powered hardware to be used.

Figure 5:
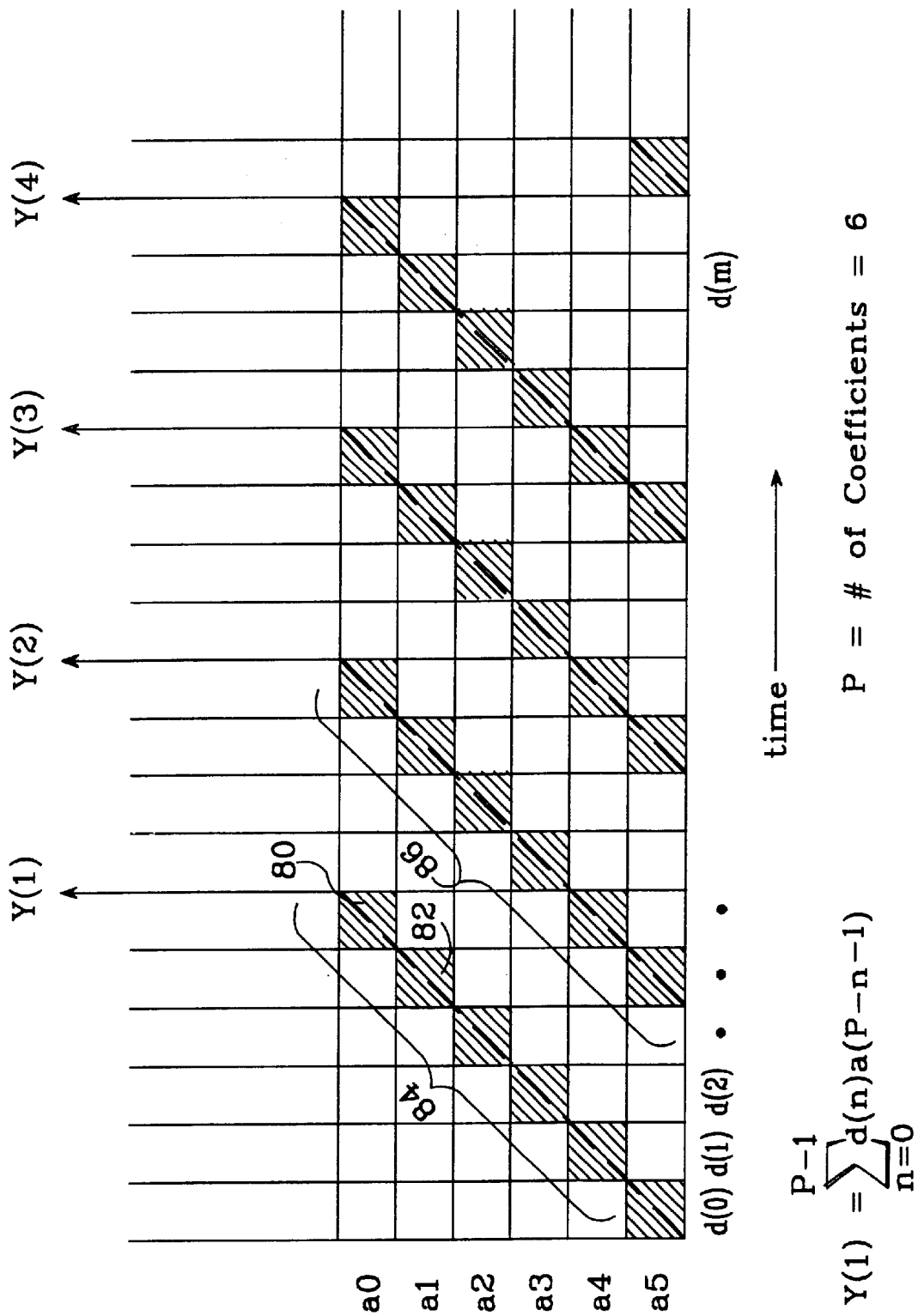
FIG. 5 is a graph illustrating a multiplexing method of simultaneous resampling and digital filtering preferably used in the invention, wherein data points at discrete times are graphically represented as columns, filter coefficients are represented as rows, and a data-coefficient product is shown by a cross-hatched square where the corresponding row and column intersect.
Figure 6:
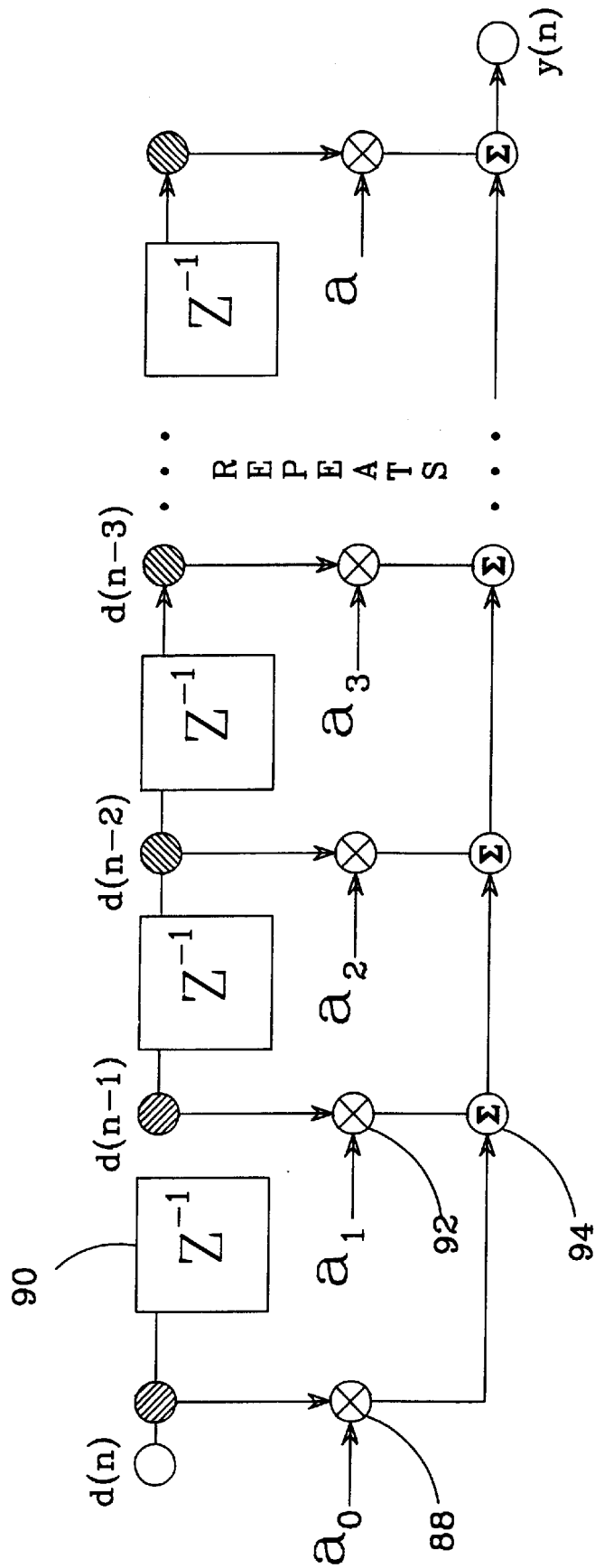
FIG. 6 is a state diagram of a generalized FIR filter architecture preferably used in the resampling/filtering step of FIGS. 4 and 4a (and further illustrated in FIG. 5)

In the aforementioned economical method of filtering with resampling, the signal is manipulated as shown in FIG. 5. Only four periods of resampling are completely shown. The values of the signal, d(0) . . . d(m), are processed (digitally filtered and resampled) to produce a single resampled signal value $Y_n$ for each period $\tau$, where $\tau$ is longer than the sampling period of the original signal by a factor of R (the "resampling factor") This corresponds to filtering and resampling the signal at a frequency Frs, given an original signal sampled at $F_s$, where $F_{rs}$ equals $F_s/R$. For each period, P signal values d(n−P) through d(n) are multiplied by respective predetermined coefficients a(P) through a(0) and the resulting products are summed. For example, the FIG. 6 shows filtering with a six coefficient digital filter (P=6), with resampling at a resampling factor R of 4. The data values d(0) through d(m) are arranged on the horizontal (time) axis, while the coefficients a(5) through a(0) are arranged on the vertical axis. The rows and columns thus defined form a graphic matrix. The shaded squares of the graphic matrix, such as 80, indicate that the corresponding coefficient and data point are to be multiplied. In other words, the shaded squares represent the product of the row coefficient and the column data point which include the shaded square. Specifically, square 80 represents taking the product of a(0)d(5), square 82 represents the product a(1)d(4), etc.

The resampled and filtered Y(n) values are obtained by summing the products along the diagonals, according to the equation:

$$Y(n) = \sum_{m=0}^{m=P-1} d(n+m)a(P-m-1)$$

For example, in the figure Y(1) is obtained by summing the products along diagonal 84, Y(2) is obtained by summing along diagonal 86, and so forth.

FIG. 6 shows in state diagram form the same process illustrated in the timing diagram of FIG. 6 discussed above. From FIG. 7 it can be seen that the result of multiplexing the signal, multiplying as shown and accumulating is similar to a Finite Impulse Response (FIR) digital filter. The architecture is essentially that of a P stage FIR filter. Data values entering the filter are multiplied with a coefficient $a_0$ by coefficient multiplier module 88. The data value is stored for one cycle by state delay module 90, which could suitably be implemented by a shift register, latch, or similar memory element. The delayed data value is multiplied with another coefficient $a_1$ by multiplier 92 and the result is summed with the output of 88 by a summation module 94. The further stages continue the process in a cascade, as shown, with one stage (state delay) for each coefficient. The ultimate sum is output as Y(n), the filtered data value. It should be noted, however, that unlike a conventional FIR filter which performs the indicated calculations every cycle, in the "downsampling" module 53 the operation is performed only once for every R clock cycles. The result is simultaneous filtering and resampling with savings of operations as compared to sequentially filtering, then resampling.

The coefficients $a_1$ through $a_m$ can be chosen to produce any of various pass characteristics, as is known from the art of digital filters. By choosing appropriate pass characteristics, the desired frequency range (aliased band) is selected. In practice, a lowpass filter is usually chosen to select the true signal and reject aliased signals, but bandpass filters could also be used to select higher frequency passbands, which would be aliased into the lower frequency region for analysis. For example, if a 2000 Hz resampling rate is used, any of multiple 2000 Hz windows can be chosen by filtering out the undesired spectral components of the original sampled signal. Table 1 gives, by way of example only, a set of coefficients which can be suitably used to realize a lowpass function in the 0 Hz to 3,600 Hz frequency region, with the pass characteristics graphed in FIG. 7.

TABLE 1

| | |
|---|---|
| a0 | −0.0175 |
| a1 | 0.0183 |
| a2 | 0.0192 |
| a3 | 0.0207 |
| a4 | 0.0189 |
| a5 | 0.0119 |
| a6 | −0.0002 |
| a7 | −0.0151 |
| a8 | −0.0284 |
| a9 | −0.0352 |
| a10 | −0.0309 |
| a11 | −0.0129 |
| a12 | 0.0184 |
| a13 | 0.0594 |
| a14 | 0.1037 |
| a15 | 0.1433 |
| a16 | 0.1707 |
| a17 | 0.1805 |
| a18 | 0.1707 |
| a19 | 0.1433 |
| a20 | 0.1037 |
| a21 | 0.0594 |
| a22 | 0.0184 |
| a23 | −0.0129 |
| a24 | −0.0129 |
| a25 | −0.0352 |
| a26 | −0.0284 |
| a27 | −0.0151 |
| a28 | −0.0002 |
| a29 | 0.0119 |
| a30 | 0.0189 |
| a31 | 0.0207 |

TABLE 1-continued

| | |
|---|---|
| a32 | 0.0192 |
| a33 | 0.0183 |
| a34 | −0.0175 |

Passband frequency=3600 Hz
Stopband frequency=5100 Hz
Passband ripple=1 db
Stopband attenuation=27 db Optionally, the filter coefficients and resampling rate can be varied in the invention, dynamically, by loading parameters (including resampling rate and filter coefficients) from the microprocessor 34 to the digital signal processor (DSP) 32, via the signal pathway 96 shown (in FIG. 2).

After resampling and filtering, the signal data is further processed by transforming it into a frequency domain representation, preferably by a dedicated signal processing circuit configured to perform Fast Fourier Transformation (FFT) or a similar transformation. Alternatively, other analytical transformations could be used, such as a wavelet decomposition. The frequency domain data (or otherwise decomposed data) is then passed to the microprocessor 34 for further processing.

RPM of the rotating machinery is preferably detected by analysis of the vibrational spectrum, without other input. This facilitates installation of the apparatus of the invention and reduces expense.

Figure 8:
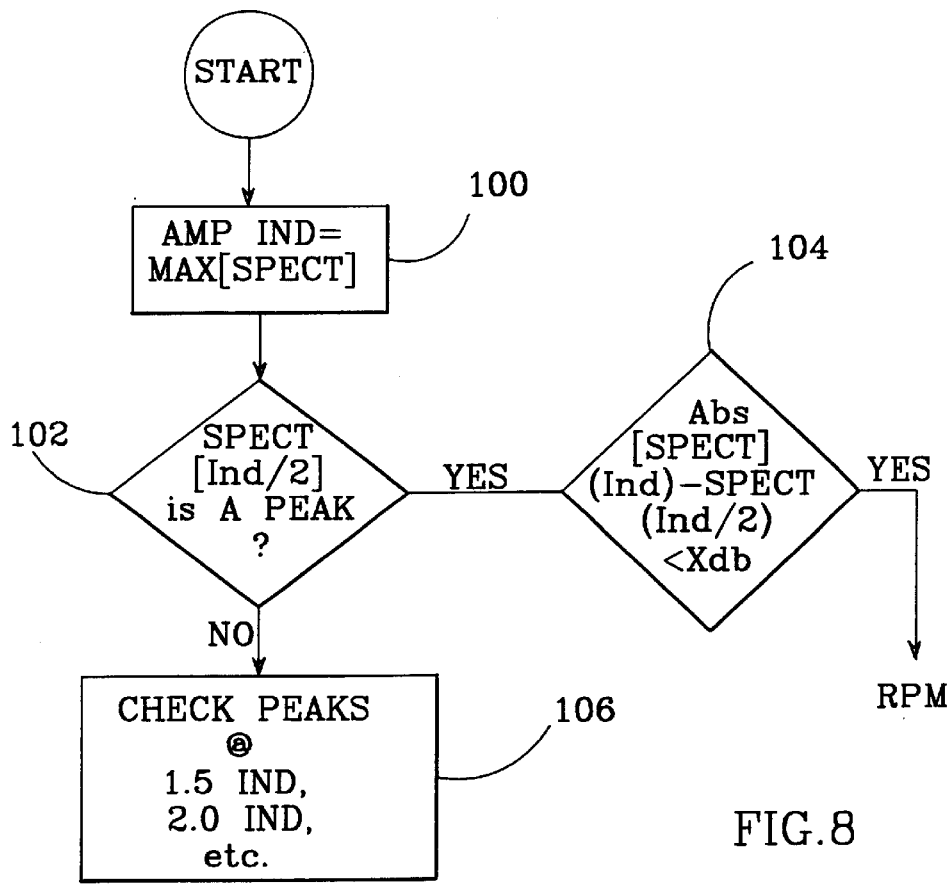
FIG. 8 is a flow diagram of method preferably used in the RPM detection step of FIGS. 4a and 4b.

FIG. 8 shows a flow chart for a method which is preferably used in the invention to detect, by analysis of the vibrational spectrum, the fundamental frequency of rotation of the machinery being monitored. This method is preferably programmed into and executed by the microprocessor 34.

In the method, the vibrational spectrum is first analyzed (step 100) to find the frequency peak (the "indicator") with the highest intensity. It has been found in practice that this peak usually corresponds either to the RPM of the motor or to a harmonic of (usually 2x) the RPM of the motor. Next, the spectrum is examined (step 102) to determine whether the frequency at half the indicator frequency is also a peak. If yes, the method inspects further to determine (step 104) whether the absolute value of the amplitude of the indicator (ind) is higher than the absolute value of the indicator's half frequency peak by more than some value x in decibels. (A value of x of 5 db has been found suitable). If yes, it is concluded that the RPM of the motor is at one-half the indicator frequency (and that, consequently, the indicator frequency peak is the first harmonic at double the RPM). If not, or if the frequency at ind/2 is not a peak, the method checks (step 106) for harmonics at 1.5 times indicator frequency, at twice the indicator frequency, and at other such multiples. If harmonics are found at 1.5 times the indicator, it is concluded that the indicator peak is a first harmonic (twice the RPM).

Although variations on this method are possible, the general procedure to be applied is to detect a spectral peak, then assume a hypothesis regarding the relationship of the peak to the RPM. The harmonic series which would result from the hypothesis is then calculated and compared with the measured spectrum of the vibrations to determine whether and to what degree the measured spectrum matches the hypothetical predicted spectrum (or deviates therefrom). If the match is good, the hypothesis is assumed to be correct and the spectral peak is estimated to be the actual RPM. If not, another hypothesis is adopted and checked. Eventually a hypothesis is developed which results in an acceptable prediction of harmonics (or else the method fails). The RPM is then calculated from the known indicator peak, based on the successful hypothesis regarding the ratio of the indicator peak to the motor RPM. In difficult cases (noisy spectra) multiple trials can be made and the RPM estimate which prevails the most often is adopted.

In an alternate embodiment of the invention, another functional module 60 (in FIG. 4b) is present, in addition to the RPM detection module 56. It is advantageous to detect the number of rolling elements in the bearing under measurement, because that information allows the prediction of certain harmonic frequencies which contain specific information relevant to diagnosing the bearing. This module is preferably implemented under software control by the same microprocessor (or data processor) which is used to implement the RPM detection module.

Figure 9:
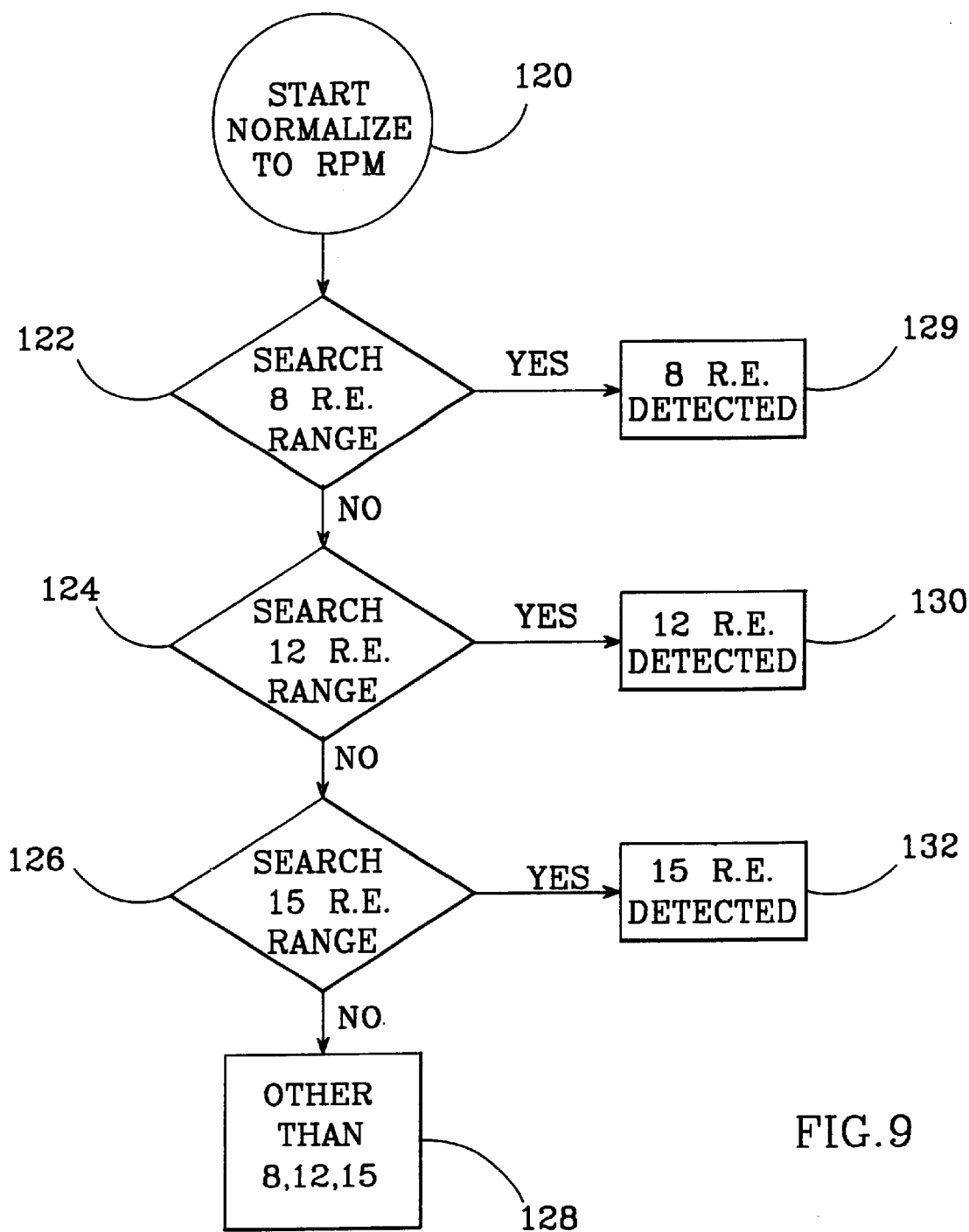
FIG. 9 is a flow diagram of a rolling elements enumerator step preferably used in the method of FIG. 4b.
Figure 11A:
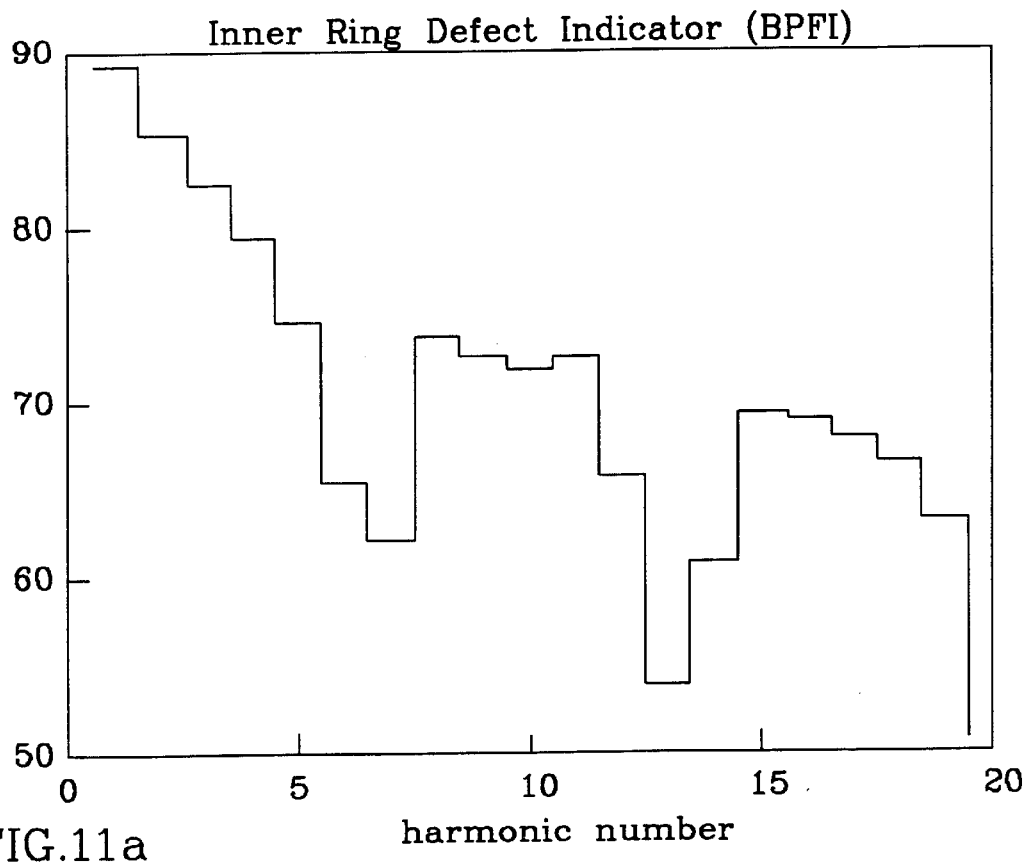
FIGS. 11a–11d are histograms of intensity on the vertical (in decibels) versus harmonic number on the horizontal scale, for four respective defect indicator profiles preferably used as diagnostic parameters in the invention.
Figure 11B:
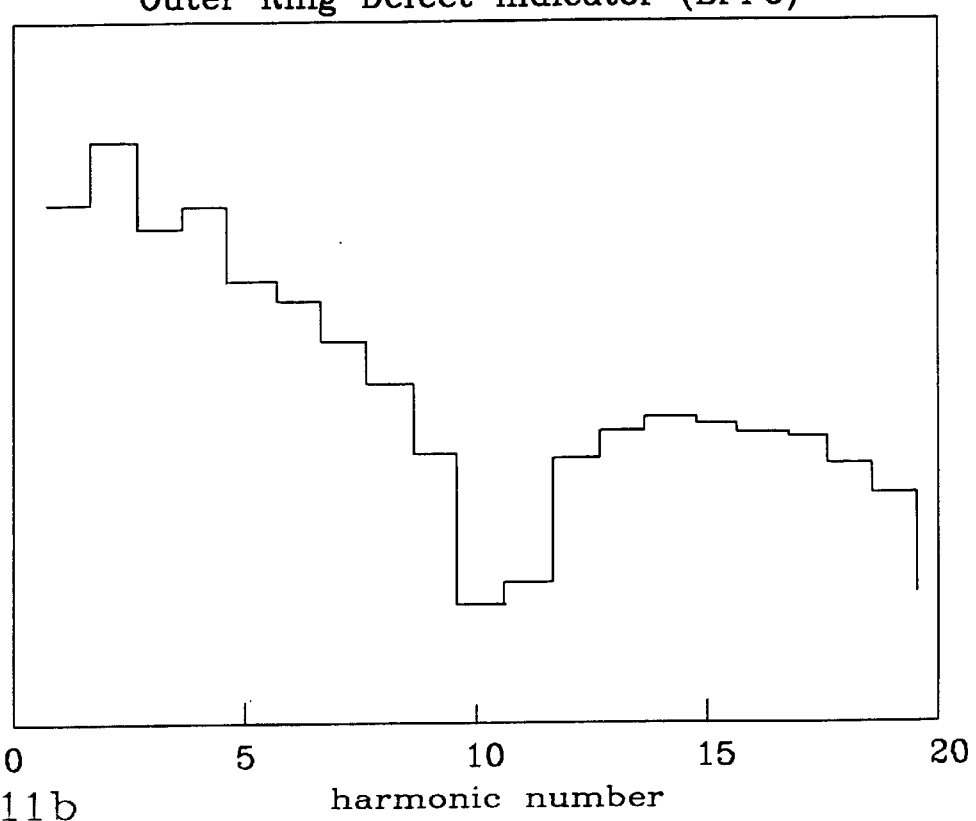
Figure 11C:
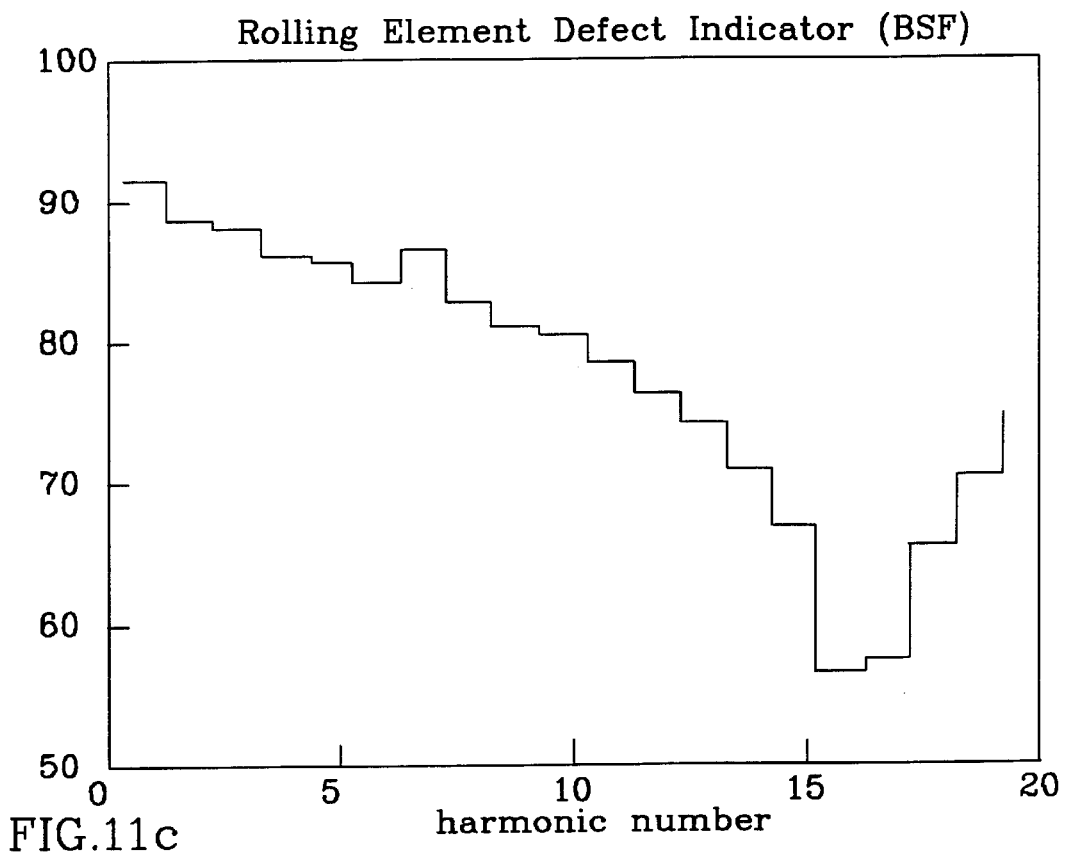
Figure 11D:
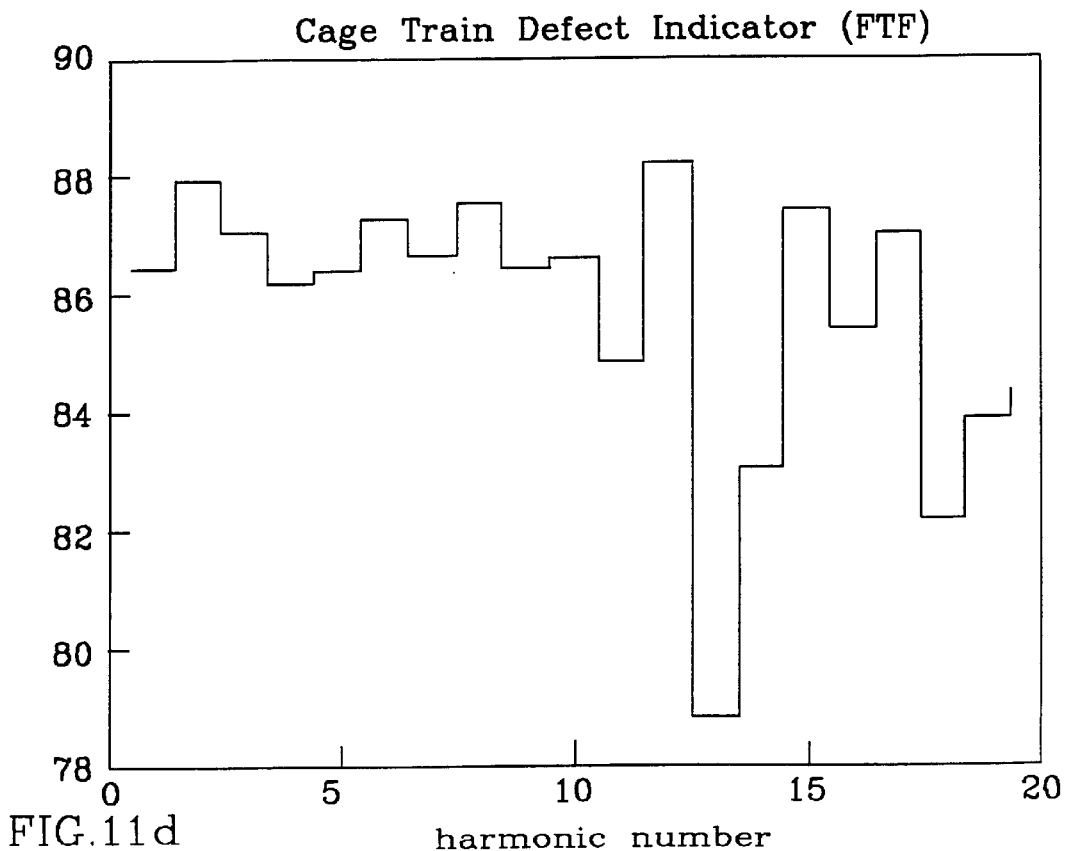

The preferred method of rolling element detection, shown in FIG. 9, exploits the experimentally determined fact that rolling bearings have patterns of tones which occur at known, non-integer multiples of the shaft RPM. The specific non-integer multiples of the RPM depend on the number of rolling elements present in the bearing, and to some degree on the geometry of the bearing. For formulae giving bearing indicator frequencies in terms of the number of bearings and bearing geometry, see Geitner, op. cit. at pp. 430–432.

Without knowledge of the specific bearing or its geometry, the method of the invention searches certain frequency ranges, defined as multiples of the shaft RPM, within which the bearing indicator tones are most likely to fall. The most commonly used bearing indicator tones are the Inner Ring Defect indicator tone (also called the ball pass frequency, inner race, or BPFI); the outer ring defect tone (ball pass frequency, outer race or BPFO); the Rolling Element defect tone (ball spin frequency BSF); and the Cage Train Defect Indicator (fundamental train frequency, or FTF). Before searching the ranges, the spectrum should preferably be prepared by removing or limiting any signals within the search range which coincide with integer multiples of the RPM. Such signals are most likely exact harmonics of the fundamental RPM rather than the indicator tone, which will generally occur at a non-integer multiple of the RPM. Some specific expected frequency ranges suitably searched for indicator tones are given in table 2, where col. a contains the center of the search range and col. b contains the search range width Δ (the search is over center frequency +/−Δ/2). Search ranges for other numbers of rolling elements can be determined empirically, and the method can thereby be extended to any number of rolling elements.

TABLE 2

| | f center (in RPM) | Δf |
|---|---|---|
| 8 Elements: | | |
| BPFI | 4.95 | 0.1 × BPFI |
| BPFO | 3.1 | 0.2 × BPFO |
| BSF | 1.98 | 0.11 × BSF |
| BTF | 0.38 | 0.04 × FTF |
| 12 Elements: | | |
| BPFI | 7.2 | 0.1 × BPFI |
| BPFO | 4.9 | 0.2 × BPFO |
| BSF | 1.98 | 0.11 × BSF |
| BTF | 0.38 | 0.04 × FTF |

Referring to FIG. 9, a method is shown which is suitable for determining from the vibrational spectrum of a bearing the most likely number of rolling elements included in the bearing. The example shown includes options for 8, 12 or 15 rolling elements, but the method could be readily extended to include other numbers of rolling elements. Initially, the spectrum should preferably be normalized (step 120) with respect to the shaft RPM (which has been previously determined, preferably as in FIG. 8 above). Alternatively, the frequency ranges to be searched can be calculated as multiples of the shaft RPM. Either method results in a comparison of frequencies relative to the shaft RPM.

The method of determining number of rolling elements proceeds essentially with a series of tests for peaks within certain indicator frequency ranges (calculated from Table 2). It has been found that a search for the BPFI is generally most effective to identify the number of bearings, but other indicators could be used as supplemental or substitute indicators. In the following explanation, BPFI is referred to for specificity, it being understood that other indicators could be substituted or added. First, the vibrational spectrum is checked (step 122) for peaks in the 8 element BPFI range, (as determined by table 2 or a similar empirically derived look-up table). If none is detected, the spectrum is checked for peaks in the 12 element BPFI range (step 124); again, if no peak is detected, the spectrum is tested (step 126) for peaks between in the 15 element expected BPFI range. If none of these tests is positive, then it can be concluded (step 128) that the bearing has other than 8, 12, or 15 rolling elements. If any of the 8, 12 or 15 rolling element tests is successful in locating a peak in range, the method branches and detects either 8 (step 129), 12 (step 130) or 15 (step 132) rolling elements. After the RPM (and optionally the number of rolling elements) have been determined and stored, the data processor proceeds to form and store baseline diagnostics (step 47 in FIG. 3) preferably by the method shown in FIG. 10.

Figure 10:
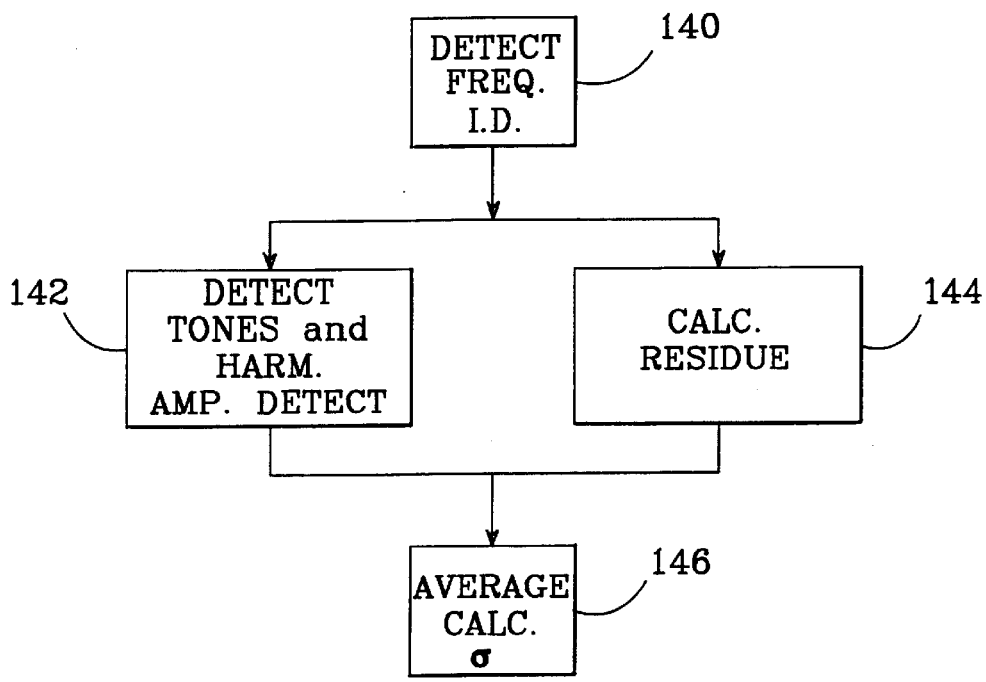
FIG. 10 is a flow diagram showing details of a method which is preferably used in the invention to quantify diagnostic parameters of a bearing.

Referring to FIG. 10, one or more defect tones are identified (step 140) by calculation from the previously determined RPM and the previously determined number of rolling elements. The defect tones are preferably chosen from the group which includes: BPFI, BPFO, BSF and FTF. In an embodiment including rolling element enumeration, at least the BPFI peak has already been identified in the vibrational spectrum by searching the range indicated by Table 2, above. Any of the indicator peaks not previously identified can now be easily identified by using Table 2 as a lookup table, given the now known number of rolling elements and the current RPM. Alternatively, if bearing geometry and number of rolling elements is known, the indicator frequencies can be calculated from well known relationships.

Next, the method executes at least one of steps 142 and/or 144. Step 142 calculates, from the measured vibrational spectrum, the amplitude (or power) discrete spectral regions corresponding to a defect tone and each of its harmonics. The result is a defect indicator profile (if it is derived from the baseline data, it defines a defect indicator "envelope"). Referring to FIGS. 11*a*–11*d*, Four examples of defect indicator profiles are shown. The histograms indicate the spectral power (in decibels) within each harmonic (integer multiple frequency) of the defect tones corresponding to the inner ring defect indicator, outer ring defect indicator, rolling element defect indicator, and cage train defect indicator, in 11*a*, 11*b*, 11*c*, and 11*d* respectively. The fundamental RPM tone and its integer harmonics is optionally also used to construct a profile. Each such indicator profile is preferably stored as an array or other similar data "n-tuple", associating an amplitude with each harmonic number. For example, the inner ring defect indicator profile might be defined from the fundamental up to the $20^{th}$ harmonic, and stored as a 20 byte array, each byte containing the amplitude of the signal at a respective harmonic number. Thus the profile defines a harmonic series.

The baseline defect indicator profiles define indicator "envelopes" for later comparison with profiles from later obtained signals. For example, the profile of FIG. 11*a*, constructed from baseline vibration data, defines an inner ring defect indicator envelope.

Returning to FIG. 10, preferably another type of diagnostic is also calculated, referred to herein as the "residue" (calculated in step 144). This residue is defined as a ratio in which the numerator is the total spectral energy integrated across all detected frequencies exclusive of the fundamental RPM and its harmonics (integer multiples) and the denominator is the sum of the spectral energy contained in the fundamental RPM frequency and all of its harmonics (assuming some realistic line width for the fundamental and harmonics, for example the 10 db attenuation frequency above and below peak frequency) This definition of "residue" has been found to provide a useful diagnostic. A 25% increase in residue, for example, is associated with developing bearing problems.

After the defect profiles (tones and harmonic spectral intensity) and the residue (collectively the defect indicators) are calculated in steps 142 and 144, they are preferably averaged (step 146) over some time interval (for example, 1 minute) to provide a less noisy measurement of the indicators. It is also advantageous during step 146 to measure the variance or (equivalently) the standard deviation $\sigma$ of several measurements, taken at slightly different times. In particular, the standard deviation of a group of measurements of the amplitude of an indicator fundamental tone (bearing defect indicator tone) is found to be a useful parameter for diagnostics, as discussed below. Only the peak value within each harmonic range need be stored, along with its associated harmonic, for each fault indicator.

The above steps produce a set of baseline measurements, preferably including:

RPM (frequency and amplitude)

Number of rolling elements of bearing N

Defect frequencies (fundamental defect tones)

Defect indicator profiles (fundamentals' and harmonics' amplitudes):
  Inner ring
  Outer ring
  Rolling Elements
  Cage train
  RPM Residue Standard deviations $\sigma$ of defect tones over time period sampled.

The above baseline parameter values are stored, preferably on the microprocessor 34 (in FIG. 2).

After some time period (predetermined, user determined, or triggered on some event) the vibrations of the machine are resampled and processed (step 49 in FIG. 3), in the same manner as during baseline acquisition (step 47 of FIG. 3, shown in detail in FIG. 10). It is significant that in general, the RPM could have changed from the value determined during baseline parameter calculation. For example, a variable speed motor might be the source of the vibrational signal. Nevertheless, directly comparable defect parameters are calculated by the method because such parameters (other than fundamental RPM) are all defined in terms of RPM and its multiples, or the defect frequencies and their multiples. The parameters are thus normalized with respect to RPM. If the motor under measurement speeds up, for example, the RPM increases, the corresponding calculated defect tone frequencies proportionally increase, etc. The resulting profiles can still be directly compared against previously measured baseline profiles obtained at a different RPM, because the profiles are given as amplitude versus harmonic number for each defect tone.

Figure 12:
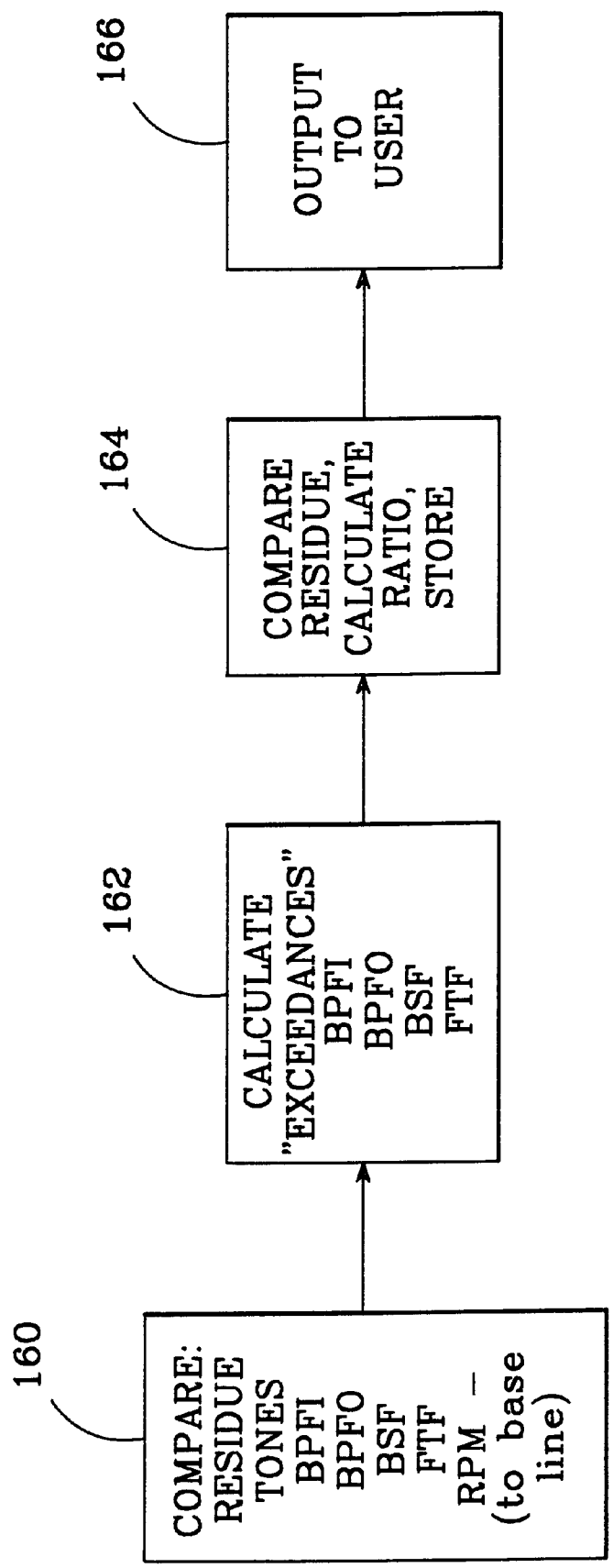
FIG. 12 is a flow diagram for a method of comparing diagnostics to baseline indicators, suitable for use by the invention.

After obtaining the run-time parameters, diagnostics are performed, preferably by one or more comparisons as shown in FIG. 12. Although many variations are possible, the invention preferably includes diagnostics based on comparing at least one of several "defect indicators" chosen from the group consisting of the motor RPM profile, the residue, the inner ring defect indicator (BPFI) profile, the Outer ring defect indicator (BPFO) profile, the rolling element defect indicator (BSF) profile, and the cage train defect indicator (FTF) profile. It is most preferred that all of the aforementioned tones be considered. The primary step in diagnosis is to compare at least one of the defect indicator tones' intensity (step 160) to the baseline intensity. For at least one defect indicator fundamental tone (RPM, inner ring defect, outer ring defect, rolling element defect, or cage train defect) the method compares the amplitude at run time with the amplitude during the baseline acquisition period. Deviations are then compared to the stored standard deviation of the corresponding baseline intensity (stored during step 146 above) and the deviation is assigned a "severity" rank accordingly. In one version, for example, a deviation is ranked according to the table:

TABLE 3

| | |
|---|---|
| extreme | more than 3σ deviation |
| serious | 2 to 3 σ deviation |
| moderate | 1 to 2 σ deviation |
| normal | <1 σ deviation |

This provides a diagnostic, the defect indicator deviation, for each defect tone.

Next, one or more "Exceedence" calculations 172 provide a measures of the changes in one or more defect profiles (fundamental and harmonics) as compared with the corresponding baseline profiles. For one or more of the defect indicator profiles, a corresponding exceedence value E is calculated according to the formula:

$$E = \sum_{i=1}^{i=N} Exceedence(i)$$

where i is the harmonic number identifying each harmonic of the defect tone, Exceedence(i) is the excess intensity of the run-time harmonic (i) over the baseline intensity, and N is the total number of harmonics considered in the profile.

Preferably the harmonic number i of the harmonic with the greatest excess over baseline is also determined and stored as a diagnostic parameter. It is most advantageous if all four defect indicator profiles (inner ring, outer ring, rolling element, and cage train) are used to calculate independent "exceedence" diagnostics, which are stored.

The residue is also preferably compared (in step 164), with the baseline residue, and the ratio calculated and stored. Changes in the residue have been found to correlate with bearing wear.

Finally, the stored diagnostics are output to a user (step 166), or used to trigger some action, such as shutting down the machinery in an emergency situation. As previously shown in FIG. 1, the output is preferably by a wireless data link with a user receiver station, which then displays the information to a user. FIGS. 13a and 13b show a typical user display (in this case a printout) which summarizes the diagnostics obtained from a rotating motor bearing. It includes information identifying the number of rolling elements (180), RPM 182, Sampling frequency 184, downsampling factor 186, residual diagnostics 188, inner ring diagnostics (fundamental deviation and exceedences) 190, outer ring diagnostics (fundamental deviation and exceedences) 192, rolling element diagnostics (fundamental deviation and) 194, cage train diagnostics 196, and motor RPM diagnostics 198.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A method of processing a sampled, digitized signal to obtain improved frequency resolution in a spectral sub-band, suitable for analyzing the vibrational spectrum of a machine, comprising the steps of:

computing an output value $Y_n$ corresponding to each discrete time $t_n$, according to the formula:

$$Y_n = \Sigma a_m X(t_{n+m})$$

where $X(t_{n+m})$ are the values of the sampled signal sampled at times $t_{n+m}$, $a_m$ are pre-determined coefficients chosen to provide a desired digital filter characteristic, and the signal is resampled at a rate F/m, where F is the original sampling rate and m is an predetermined integer.

* * * * *